(12) United States Patent
Kondrus et al.

(10) Patent No.: US 12,060,961 B2
(45) Date of Patent: Aug. 13, 2024

(54) EXPLOSION-PROOF ARRANGEMENT

(71) Applicant: R. STAHL SCHALTGERÄTE GMBH, Waldenburg (DE)

(72) Inventors: Elena Kondrus, Künzelsau (DE); Bernd Limbacher, Schwäbisch Hall (DE); Holger Semrau, Satteldorf (DE); Jürgen Schmitt, Öhringen (DE)

(73) Assignee: R. STAHL SCHALTGERATE GMBH, Waldenburg (DE)

( * ) Notice: Subject to any disclaimer, the term of this patent is extended or adjusted under 35 U.S.C. 154(b) by 228 days.

(21) Appl. No.: 17/623,037

(22) PCT Filed: Jun. 23, 2020

(86) PCT No.: PCT/EP2020/067510
§ 371 (c)(1),
(2) Date: Dec. 27, 2021

(87) PCT Pub. No.: WO2020/260286
PCT Pub. Date: Dec. 30, 2020

(65) Prior Publication Data
US 2022/0316625 A1 Oct. 6, 2022

(30) Foreign Application Priority Data
Jun. 27, 2019 (DE) .......................... 102019117409.0

(51) Int. Cl.
*F16L 5/04* (2006.01)
*H02G 3/06* (2006.01)
*H02G 3/08* (2006.01)

(52) U.S. Cl.
CPC .............. *F16L 5/04* (2013.01); *H02G 3/0625* (2013.01); *H02G 3/083* (2013.01); *H02G 3/088* (2013.01)

(58) Field of Classification Search
CPC . F16L 5/04; F16L 5/06; H02G 3/0625; H02G 3/083; H02G 3/088; H02G 3/0616; H02G 3/22; H05K 5/0213
(Continued)

(56) References Cited

U.S. PATENT DOCUMENTS 2,365,785 A 12/1944 Tinnerman
3,104,120 A 9/1963 Myers
(Continued)

FOREIGN PATENT DOCUMENTS

CN 201540138 U 8/2010
CN 103534886 A 1/2014
(Continued)

OTHER PUBLICATIONS

German Office Action for German Application No. 102019117409.0; Date of mailing: May 27, 2020; 5 Pages.
(Continued)

*Primary Examiner* — Mark R Wendell
(74) *Attorney, Agent, or Firm* — CANTOR COLBURN LLP

(57) ABSTRACT

The invention relates to an explosion-proof arrangement (10) with an explosion-proof housing (11) which has a wall opening (23) in a housing wall (12). The wall thickness (d) of the housing wall (12) is so small that it is not possible to form a thread there in order to screw in a connecting body (15) for a line to pass through or for receiving an assembly so as to ensure protection against flame transmission. According to the invention, a connecting body (25), which has a flange (38) with a flange face (39), is inserted into the wall opening (23). The flange face (39) delimits a flame-proof gap (58) by way of the housing wall (12). The dimensions of a gap or intermediate space between the connecting body (25) and a boundary face (24) of the
(Continued)

housing wall (12), which boundary face delimits the wall opening (23), are not important. The protection against flame transmission can be provided solely by the flameproof gap (58) between the flange face (39) and the housing wall (12).

20 Claims, 8 Drawing Sheets

(58) Field of Classification Search
USPC .......................................................... 52/317
See application file for complete search history.

(56) References Cited

U.S. PATENT DOCUMENTS

| | | | |
|---|---|---|---|
| 5,399,807 | A | 3/1995 | Yarbrough et al. |
| 8,987,592 | B2 | 3/2015 | Mack et al. |
| 9,478,955 | B2 | 10/2016 | Wondrak |
| 10,211,616 | B2 | 2/2019 | Sauer et al. |
| 10,312,674 | B2 | 6/2019 | Semrau et al. |
| 11,424,607 | B2 | 8/2022 | Kutsch et al. |
| 2015/0171606 | A1 | 6/2015 | Wondrak |
| 2018/0226179 | A1 | 8/2018 | Kutsch et al. |

FOREIGN PATENT DOCUMENTS

| | | |
|---|---|---|
| CN | 104081167 A | 10/2014 |
| CN | 108028518 A | 5/2018 |
| CN | 104584352 B | 7/2018 |
| CN | 108141024 B | 7/2021 |
| DE | 3110240 A1 | 9/1982 |
| DE | 4208285 A1 | 9/1993 |
| DE | 102011001723 A1 | 10/2012 |
| DE | 102012100120 A1 | 7/2013 |
| DE | 102014100492 A1 | 7/2015 |
| DE | 102016112076 B3 | 12/2017 |
| EP | 0778438 A1 | 6/1997 |
| RU | 2028019 C1 | 1/1995 |
| RU | 2186450 C1 | 7/2002 |
| RU | 39751 U1 | 8/2004 |
| RU | 79743 U1 | 1/2009 |
| RU | 192775 U1 | 10/2019 |
| WO | 2015106996 A1 | 7/2015 |
| WO | 2016177864 A1 | 11/2016 |

OTHER PUBLICATIONS

International Search Report and Written Opion for International Application No. PCT/EP/2020/067510; Date of Completion: Sep. 22, 2020; Date of Mailing: Oct. 1, 2020; 10 Pages.

Translation of International Search Report for International Application No. PCT/EP/2020/067510; Date of Completion: Sep. 22, 2020; Date of Mailing: Oct. 1, 2020; 2 Pages.

Office Action dated Sep. 2, 2023; CN Application No. 202080046538.X; 5 pages (non-English).

Chinese Office Action (non-English) dated Feb. 8, 2023; CN Application No. 202080046538.X; 8 pages.

English Translation of Chinese Office Action dated Feb. 8, 2023; CN Application No. 202080046538.X; 6 pages.

Office Action and Search dated Aug. 22, 2023; RU Application No. 2022101160/07; 8 pages (non-English).

CNIPA Notification to Grant Patent Right for Invention corresponding to CN Application No. 202080046538.X; Issue Date, Feb. 2, 2024.

EXPLOSION-PROOF ARRANGEMENT

CROSS-REFERENCE TO RELATED APPLICATIONS

This application is a National Stage of PCT Application No. PCT/EP2020/067510 filed on Jun. 23, 2020, which claims priority to German Patent Application No. 102019117409.0 filed on Jun. 27, 2019 and entitled "Explosion-Proof Arrangement", the contents each of which are incorporated herein by reference thereto.

BACKGROUND

The invention refers to an explosion-proof arrangement including an explosion-proof housing as well as a connection body that is arranged in a wall opening in an explosion-proof manner. For example, a line can be guided into the interior of the housing in an explosion-proof manner by means of the connection body.

Such explosion-proof arrangements are known from the prior art. For example, U.S. Pat. No. 5,399,807 A discloses housing walls of different housings that comprise a wall opening in each case. The connection body is a connection sleeve screwed into internal threads formed in the wall openings. Feed through bodies and lines can be arranged in the sleeve and thus led in an explosion-proof manner from one interior into the other interior of the housings.

A cable insert stub for explosion-proof electrical devices is known from DE 31 10 240 A1. Also in this configuration an internal thread is provided in a wall opening of a housing wall of an explosion-proof housing in which a connection body in form of a connection sleeve is screwed. A line can be guided in the housing through the connection sleeve.

Starting from the prior art it can be considered as object of the present invention to further develop the explosion-proof arrangement in that the manufacturing effort is reduced, in particular for the explosion-proof housing of the arrangement.

BRIEF SUMMARY

An explosion-proof arrangement, including: an explosion-proof housing that comprises a housing wall having a wall inner surface and a wall outer surface opposite the wall inner surface, wherein a wall opening extends through the housing wall that is delimited by a threadless edge surface of the housing wall connecting the wall inner surface with the wall outer surface, a connection body comprising an insert section and a flange adjoining the insert section in an axial direction having a flange surface, wherein the insert section of the connection body extends through the wall opening and wherein the flange surface is opposed to the wall inner surface or the wall outer surface and forms a flame-proof gap.

The explosion-proof arrangement comprises an explosion-proof housing with multiple housing walls. The housing walls limit an interior of the explosion-proof housing. Each housing wall has a wall inner surface facing the interior and a wall outer surface that faces the environment. The interior of the explosion-proof housing is separated from the environment in an explosion-proof or flame-proof manner.

The explosion-proof housing is configured in an explosion protection category according to a standard and can be particularly configured in the explosion protection category "flame-proof enclosure" (Ex-d) according to one of the standards EN 60079-1 or IIC 60079-1-1.

A housing wall can thereby be moved between a closed position and an open position and can be configured as cover, flap, door or the like.

In the interior at least one ignition source can be arranged, e.g. one or more electrical and/or electronic devices or operating means. By means of the explosion-proof housing the at least one ignition source can be separated from the explosive atmosphere in the environment of the housing outside the interior. By means of the explosion-proof configuration of the explosion-proof housing, it is achieved that hot gases, sparks, flames, light arcs or other ignitable media are sufficiently cooled or extinguished or their energy is reduced before they reach the environment while escaping from the interior. In doing so, an ignition of the explosive atmosphere in the environment of the housing is avoided.

In order to be able to guide lines, operating elements or other units through a housing wall or to arrange lines, operating elements or other units in the housing wall at least one housing wall comprises a wall opening that completely extends through the housing wall. The wall opening is delimited by an edge surface. The edge surface connects the wall inner surface with the wall outer surface of the housing wall.

A connection body is arranged in this wall opening. The connection body is configured to locate a unit, e.g. a control device and/or a signaling device, or an insert for feedthrough of a line therein. For this the connection body can have respective holding means or connection means. The connection body has an insert section and a flange adjoining the insert section in axial direction, the flange having a flange surface. Preferably the flange adjoins the insert section directly. The insert section or at least a part thereof is arranged inside the wall opening and is thus located opposite the edge surface of the housing wall. The edge surface of the housing wall is threadless. Particularly the wall thickness of the housing wall is so small that a sufficient number of windings could not be introduced into the edge surface in order to establish a flame-proof thread connection between the connection body and the housing wall. Usually at least five windings are necessary for this purpose. The wall thickness of the housing wall can be approximately 1 mm or can be larger than 1 mm. Preferably the wall thickness of the housing wall is smaller than 10 mm or smaller than 8 mm or smaller than 6 mm.

The flange surface of the connection body faces the wall inner surface or the wall outer surface, such that a flame-proof gap is formed or delimited therebetween.

Thus, the flame-proof condition is established by means of the connection body, not in the wall opening due to a cooperation of the connection body and the edge surface, but adjoining thereto, due to cooperation of the wall inner surface or the wall outer surface of the housing wall and the flange surface. The flange surface can be sufficiently dimensioned orthogonal to the axial direction and particularly in radial direction and can have a width of at least 10 mm orthogonal to the axial direction. The wall inner surface or wall outer surface or the flange surface may also extend in another angle, e.g. less than 90° relative to the axial direction.

Due to these measures, it is possible to configure the wall thickness of the housing wall very small. Screwing of the connection body in the housing wall is omitted.

It is preferred, if an intermediate layer is provided between the flange surface and the wall inner surface or the wall outer surface of the housing wall. The intermediate layer can be an adhesive layer or a bonding layer. The flange surface can exclusively abut against the wall inner surface or wall outer surface via an intermediate layer or as an alternative abut in part directly against the wall inner surface or wall outer surface. In another alternative a clearance can be provided between the flange and the housing wall adjacent to the intermediate layer.

In one embodiment the intermediate layer can be a sealing body, e.g. a sealing ring. The intermediate layer can alternatively comprise at least one bonding layer in addition to the sealing body. The sealing body can be glued on the flange surface, for example, and in addition or as an alternative can be glued on the wall inner surface or wall outer surface of the housing wall.

In preferred embodiments the connection body is connected with the housing wall by means of the flange and particularly the flange surface by means of an adhesive bond or a substance bond. Particularly the adhesive bond connection or substance bond connection is established between the flange surface and the wall inner surface or wall outer surface of the housing wall. The connection can be established by gluing and/or brazing and/or welding.

In an embodiment the flange surface extends at least in part in a radial plane that is orientated radial to the axial direction. The flange surface can extend completely inside this radial plane and can thus be configured without ledges, steps or depressions. As an alternative to this, the flange can have a ring-shaped depression on its side facing the wall inner surface or wall outer surface of the housing wall. The depression is a groove or trough. In a circumferential direction around the wall opening the depression is configured in a ring-shaped manner and extends completely around 360° in circumferential direction. This depression can be configured for locating a body or a substance for creation of the intermediate layer therein and can, for example, take glue and/or an adhesive body and/or a sealing body entirely or in part therein.

It is preferred, if the intermediate layer does not project radial to the axial direction or orthogonal to the axial direction from the ring-shaped depression. Particularly, a provided intermediate layer can be completely arranged inside the ring-shaped depression. The contact between the intermediate layer and the flange surface is thus limited to the area inside the ring-shaped depression.

In a preferred embodiment a locking device is provided. The locking device is configured to secure or attach the connection body mechanically and particularly in a force-fit and/or form-fit manner on the housing wall. For example, the locking device can comprise a locking part that cooperates with the flange and that secures the connection body between the locking part and the flange on the housing wall.

In an embodiment the connection body can comprise an external thread. A locking ring can be provided as locking part comprising an internal thread. The internal thread of the locking ring can be screwed on the external thread of the connection body. By establishing of this screw connection, the housing wall can be clamped in between locking ring and flange, such that the connection body is immovably arranged on the housing wall. Instead of or in addition to the screw connection, also an adhesive connection and/or a clamping connection can be used to arrange a locking part on the connection body.

Preferably the connection body is configured in the form of a connection sleeve. The connection sleeve can have a through-hole that can be configured particularly cylindrically or circular-cylindrically. In the inner wall of the connection sleeve delimiting the through-hole a thread can be provided or the inner wall can be configured in a threadless manner. The unit or an insert for line feedthrough can be arranged in the through-hole in order to establish a flame-proof connection for arranging a unit or for feedthrough of a line between the environment and the interior of the housing.

Preferred embodiments of the invention are derived from the dependent claims, the description and the drawings. In the following preferred embodiments of the invention are explained in detail and based on the attached drawings.

DETAILED DESCRIPTION

Figure 1:
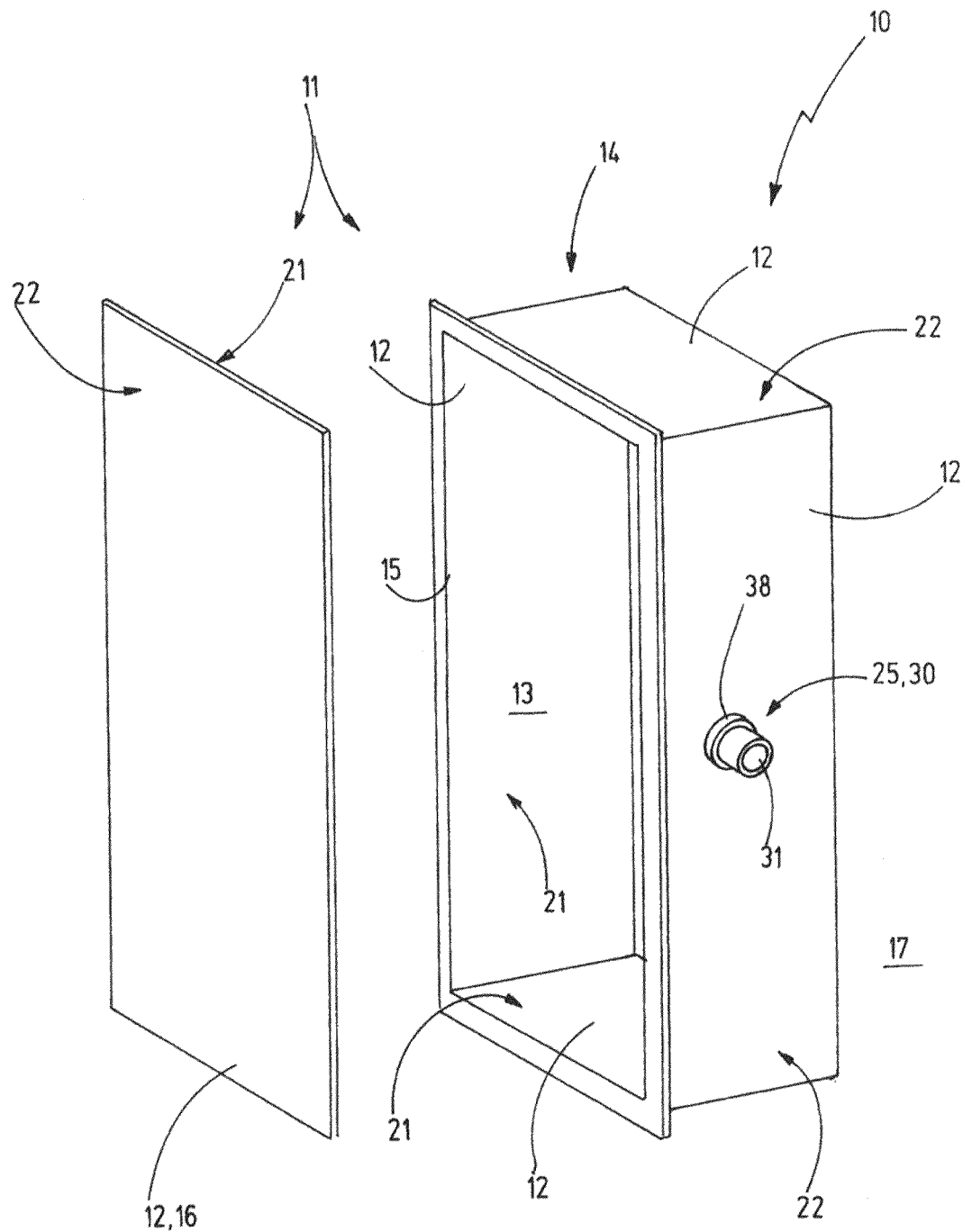
FIG. 1 a schematic perspective illustration of an embodiment of an explosion-proof arrangement having an explosion-proof housing and a connection body, FIG. 2 a schematic cross-section illustration of an embodiment of the connection body and a locking device in an explosion illustration, FIG. 3 a schematic cross-section illustration of the connection body and the locking device of FIG. 2 in an operating position attached to a housing wall, FIG. 4 a further embodiment of a connection body in a schematic cross-section illustration, FIG. 5 the connection body of FIG. 4 and an embodiment of a locking device in a schematic cross-section illustration in an operating position attached to a housing wall, FIG. 6 a further embodiment of a connection sleeve attached to a housing wall in a schematic cross-section view, FIG. 7 a further embodiment of a connection body as well as a locking device in a schematic cross-section illustration in an operating position attached to a housing wall and FIG. 8 a schematic sectional illustration of a part of another embodiment of a connection body being part of and/or for arranging a unit.
Figure 2:
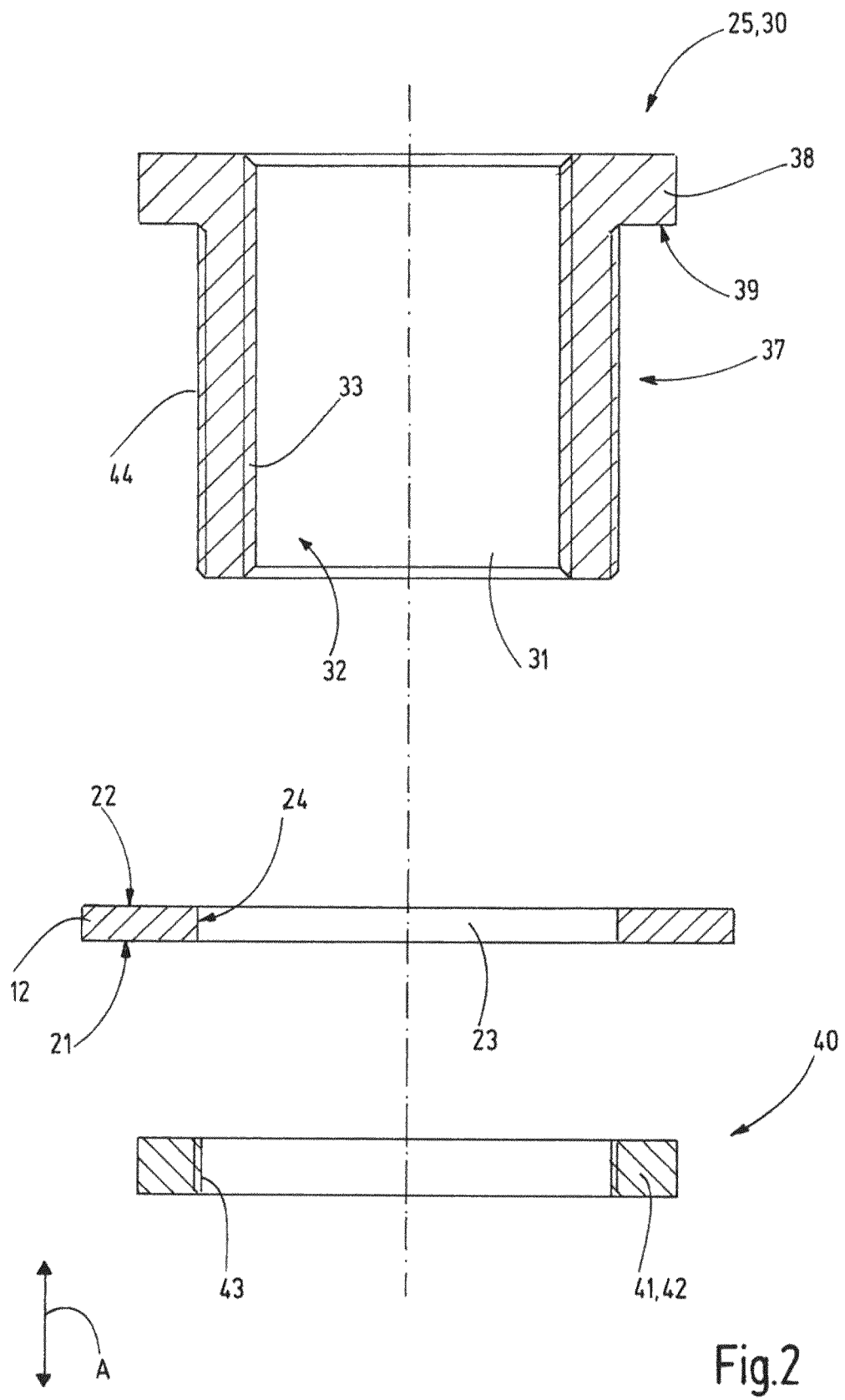

An explosion-proof arrangement 10 that comprises an explosion-proof housing 11 is schematically illustrated in FIG. 1. The explosion-proof housing 11 comprises at least one and in the embodiment multiple housing walls 12 that together delimit an interior 13. In the embodiment six housing walls 12 are present that form an approximately cube-shaped explosion-proof housing 11. The explosion-proof housing can also have other forms, e.g. a cylindrical form.

In the embodiment the explosion-proof housing 11 has a housing body 14 that is formed of multiple housing walls 12 that are connected with each other, preferably in a monolithic or in a substance bond manner. On one side housing body 14 comprises a housing opening 15. A housing wall 12 forms a cover 16 that is releasably connectable with housing body 14 and closes housing opening 15 in a flame-proof manner, if the connection is established—in a closed position. The interior 13 is accessible via housing opening 15, if the cover is in an open position, as illustrated in FIG. 1.

By means of the explosion-proof housing 11, interior 13 is thus separated from an environment 17 having an explosive atmosphere. Devices can be located in the interior 13 and can be operated without danger that form potential ignition sources for the explosive atmosphere. Such devices can be, for example, electrical and/or electronic devices or operating means.

Each housing wall 12 has a wall inner surface 21 facing the interior 13 and a wall outer surface 22 facing the environment 17. In at least one housing wall 12 a wall opening 23 is provided (FIGS. 2-8) that completely extends through housing wall 12. The wall opening 23 is limited by an edge surface 24. The edge surface 24 surrounds wall opening 23 completely in a circumferential direction. The edge surface 24 connects the wall inner surface 21 with wall outer surface 22.

A connection body 25 is arranged in wall opening 23. The connection body 25 is configured to locate an insert 26 for feedthrough of a line 27 (FIGS. 3, 5 and 7) or a unit 28 (FIG. 8) therein. The unit 28 can be an operating apparatus, such as a switching device having a manually operable switch 29 and/or a signaling apparatus having an optical and/or acoustical signaling unit. The connection body 25 can be part of unit 28.

In the embodiment the connection body 25 is configured as connection sleeve 30. The connection sleeve 30 comprises a through-hole 31 configured for locating the insert 26 and/or unit 28 therein. The insert 26 or unit 28 can be completely arranged in the through-hole 31 or can partly project from the through-hole in direction toward the interior or in direction toward the environment 17. An inner wall 32 of the connection sleeve delimiting through-hole 31 can be provided with a thread 33 for screwing in the insert 26 and/or unit 28 (FIGS. 2, 3 and 6-8). As an alternative to this, inner wall 32 of connection sleeve 30 can also be threadless and preferably free of projections and/or steps and/or depressions.

Through-hole 31 can have a cylindrical and preferably a circular-cylindrical contour. Inner wall 32 can extend along the shell surface of a circular cylinder.

In modification to the preferred embodiment, connection sleeve 30 can also have other cross-sectional shapes.

Connection sleeve 30 has an insert section 37 that is formed by a hollow cylindrical part of connection sleeve 30 in the embodiment. In an axial direction A, a flange 38 of the connection sleeve directly adjoins insert section 37. Flange 38 has a flange surface 39 on a side directly adjoining insert section 37 or facing insert section 37. The flange surface 39 extends orthogonal or radial to the axial direction A. In an embodiment the flange surface 39 can extend in one single radial plane that is orientated radial to the axial direction A (FIGS. 2, 3 and 6-8).

If the connection between connection sleeve 30 and housing wall 12 is established, insert section 37 passes through wall opening 23 such that an outer surface of insert section 37 is opposed to edge surface 24 or abuts against edge surface 24. In the embodiment the flange surface 39 is opposed to wall outer surface 22 or abuts wall outer surface 22 directly or indirectly. Alternatively to this, the flange surface 39 could also oppose wall inner surface 21 or could abut indirectly or directly on wall inner surface 21.

In some embodiments a locking device 40 is part of explosion-proof arrangement 10 that is configured to attach or secure connection body 25 or connection sleeve 30 on the housing wall 12. For this locking device 40 can have a locking part 41 that can be releasably connected with connection body 25 and particularly the insert section 37 of connection sleeve 30 in a force-fit and/or form-fit manner. Locking part 41 can cooperate with flange 38 such that the area of housing wall 12 adjoining wall opening 23 is arranged between and preferably clamped in between locking part 41 and flange 38.

In the embodiment locking part 41 can be configured as a locking ring 42 having an internal thread 43. An external thread 44 can be present on connection sleeve 30 and particularly insert section 37 that can be connected with internal thread 43 of locking ring 42. During establishment of the screw connection between locking ring 42 and connection sleeve 30 housing wall 12 can be clamped between locking ring 42 and flange surface 39. The established connection by use of locking device 40 or locking ring 42 is illustrated in FIGS. 3, 5, 7 and 8, for example.

Figure 4:
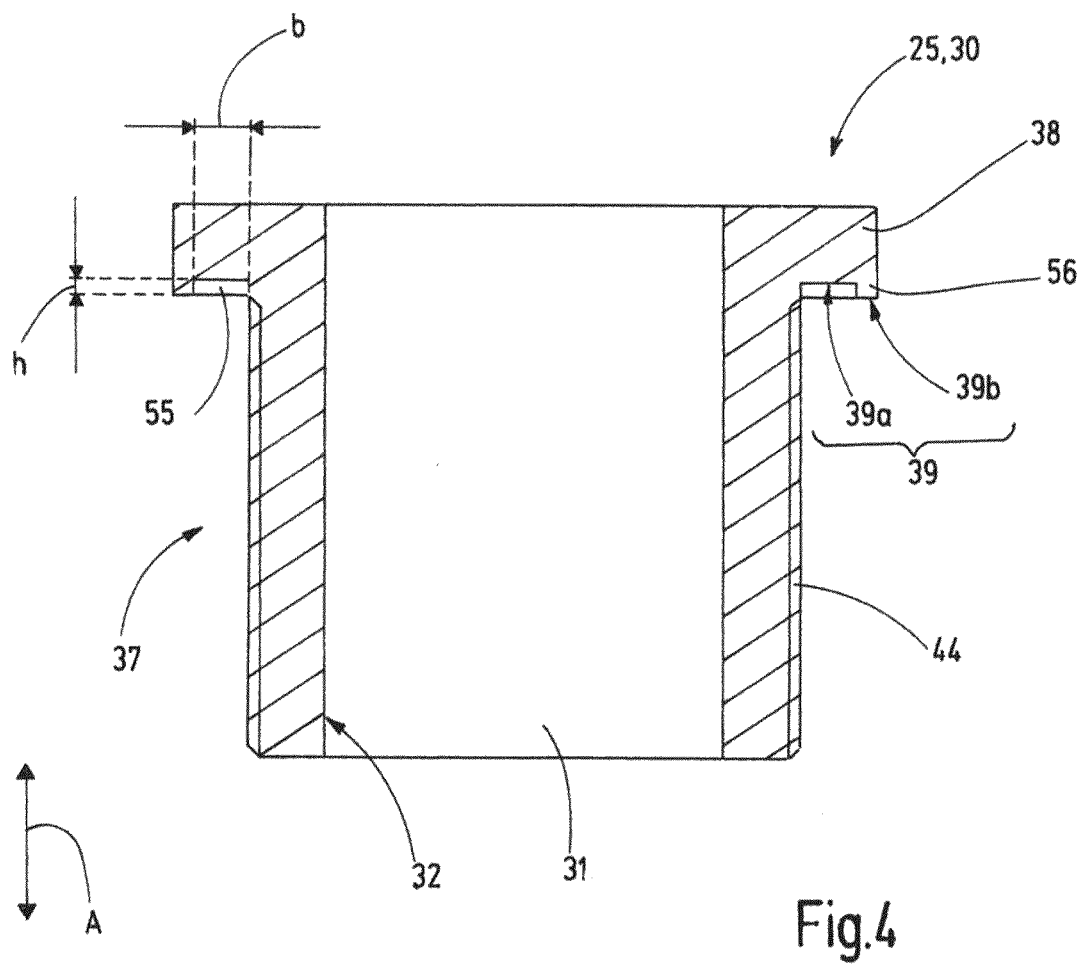
Figure 5:
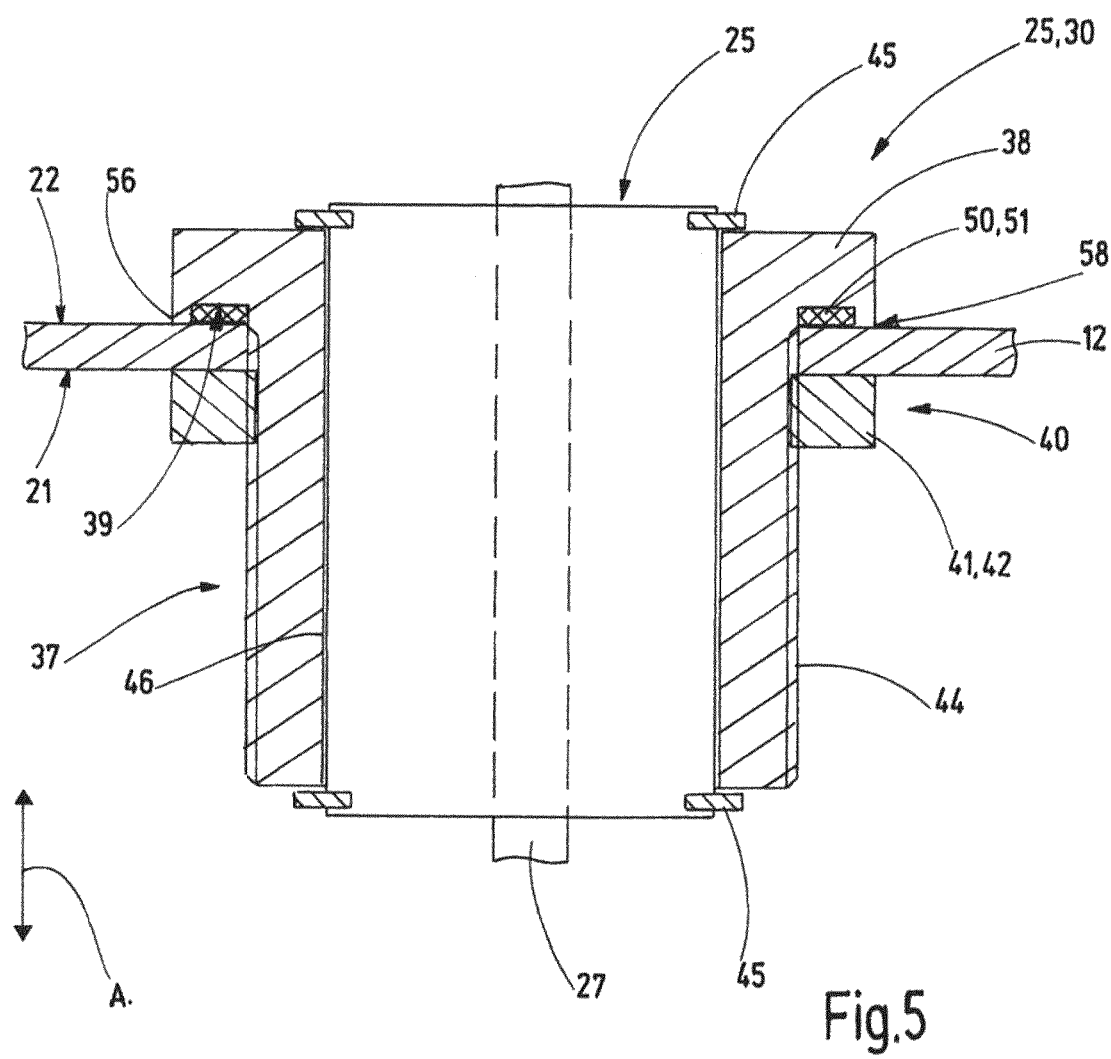

In the embodiment of connection body 25 or connection sleeve 30 illustrated in FIGS. 4 and 5, no thread is formed in the inner wall 32, but inner wall 32 extends at least in sections along a shell surface of a circular cylinder. With view in axial direction A inner wall 32 of connection sleeve 30 is thus at least in sections or completely formed in a stepless or edgeless manner. Other locking means can be present in the embodiment instead of a screw connection in order to connect an insert 26 and/or a unit 28 with connection sleeve 30. Only by way of example an embodiment is illustrated in FIG. 5 in which a locking ring or multiple locking rings 45 are arranged in an insert 26, wherein at least one locking ring 45 is releasably arranged on insert 26. The outer dimensions of the at least one locking ring 45 is larger than the outer dimension of through-hole 31 such that connection body 25 or connection sleeve 30 is arranged between locking rings 45. Locking rings 45 thus form an axial stop respectively for connection body 25 or connection sleeve 30. Also other stops could be used instead of the at least one locking ring 45 in order to create an axial abutment with connection body 25 or connection sleeve 30.

Figure 3:
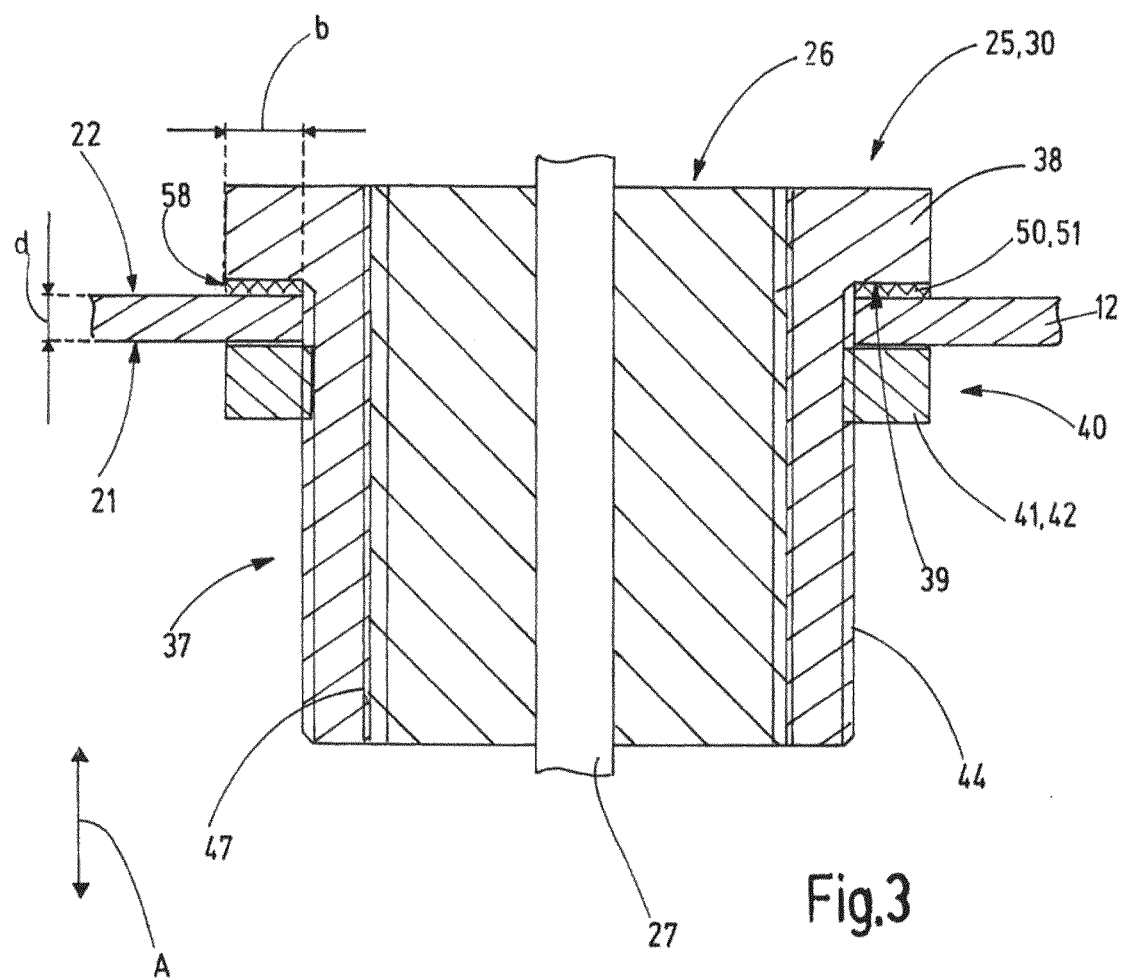
Figure 7:
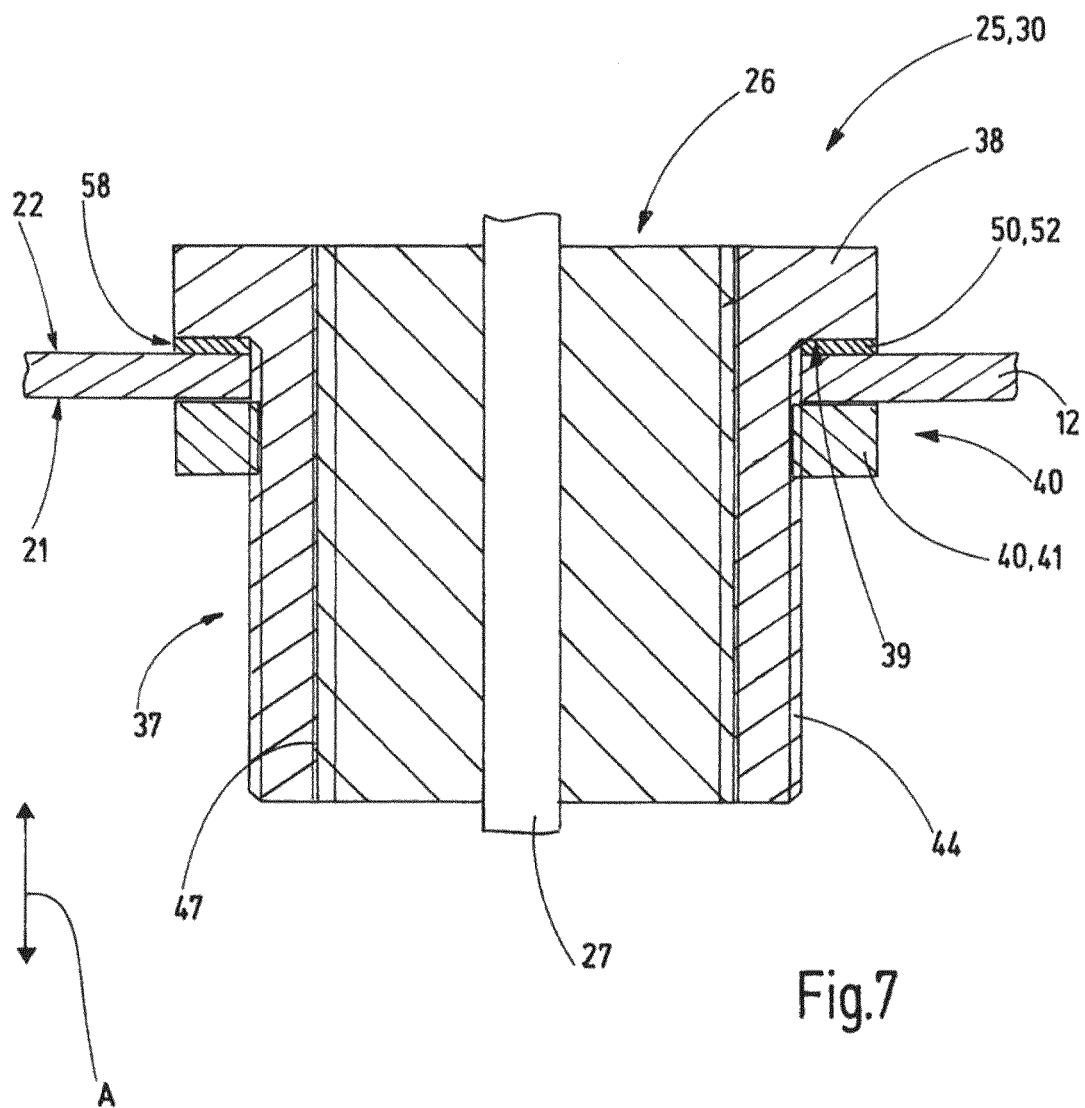
Figure 8:
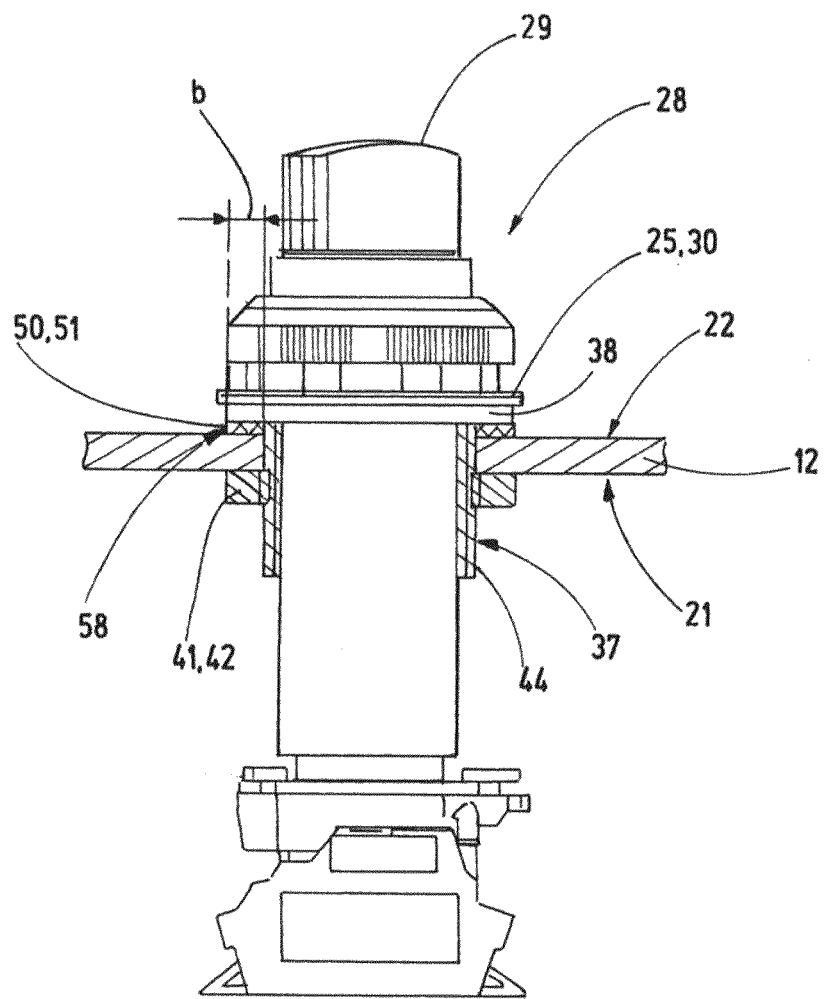

In both cases a flame-proof gap can be formed between insert 26 and through-hole 31 that can be configured either as flame-proof flat gap 46 (FIG. 5) or as flame-proof threaded gap 47 (FIGS. 3 and 7). The configuration of such flame-proof gaps are defined in the applicable standards (compare e.g. EN 60079-1).

The flange surface 39 can indirectly and/or directly abut against housing outer wall 22. In the preferred embodiments described here an intermediate layer 50 is provided that is arranged between flange 38 and housing wall 12 and separates flange surface 39 partly or completely from housing outer wall 22. In the embodiment shown in FIG. 3 intermediate layer 50 is formed by an adhesive layer 51. Adhesive layer 51 can be created by an adhesive body, e.g. an adhesive pad or by curing of an adhesive. The adhesive layer 51 connects flange 38 or flange surface 39 with housing wall 12 or wall outer surface 22.

In the embodiments described here intermediate layer 50 is configured in a ring-shaped manner in circumferential direction around axial direction A. A width b of intermediate layer 50 or adhesive layer 51 orthogonal to axial direction A is at any location preferably at least 10 mm. A width of flange surface 39 orthogonal to axial direction A can have an amount of minimum 10 mm and can, for example, correspond to width b of intermediate layer 50 or can be larger.

Intermediate layer 50 can consist of a uniform material or can contain different materials. For example, intermediate layer 50 can be configured by multiple layers in axial direction A. For example, intermediate layer 50 can contain a sealing body 52 or can be formed by sealing body 52 (FIG. 7). In this embodiment sealing body 52 is configured as circular seal with rectangular cross-section. Also in this embodiment intermediate layer 50 or sealing body 52 has the width b of at least 10 mm orthogonal to axial direction A. In the embodiment the width b is equal to the difference between an inner radius and an outer radius of intermediate layer 50 or sealing body 52.

As an option to the embodiment illustrated in FIG. 7, sealing body 52 can be connected with flange surface 39 and/or wall outer surface 22 in addition by means of an adhesive layer.

A further modified embodiment of connection body 25 or connection sleeve 30 is illustrated in FIGS. 4 and 5. In this embodiment flange 38 has a ring-shaped cavity 55 extending in circumferential direction around axial direction A on its side facing the insert section 37. This ring-shaped cavity 55 can also be denoted as ring groove and is open in axial direction A toward insert section 37. The opposed flanks and the bottom of this groove or cavity 55 is formed by flange 38. Cavity 55 serves to locate intermediate layer 50 therein, e.g. the adhesive layer 51 and/or the sealing body 52. Adjoining cavity 55 orthogonal to the axial direction A an axial projection 56 is formed thereby. Axial projection 56 as a height h in axial direction A. A first section 39a of flange surface 39 is provided within cavity 55 and a second section 39b of flange surface 39 is provided on axial projection 56.

In this configuration an axial pressing force acting on intermediate layer 50 can be limited, if connection body 25 or connection sleeve 30 is mounted on housing wall 12. During locking of connection body 25 or connection sleeve 30 by means of locking device 40 and according to the example by means of locking ring 42, second section 39b abuts against wall outer surface 22 while locking ring 42 presses against wall inner surface 21 (FIG. 5). In doing so, a deformation of the intermediate layer 50 is limited in axial direction A. This is particularly meaningful, if intermediate layer 50 is formed by a pre-shaped body, such as an adhesive body or a sealing body. Such a body can be placed inside cavity 55 and can slightly project out of cavity 55 in axial direction A. The deformation in axial direction A is limited by axial projection 56 on flange 38.

Preferably the intermediate layer 50 does not project out of cavity 55 in axial direction. According to the example, it only abuts against first section 39a of flange surface 39, but not against second section 39b of flange surface 39.

Figure 6:
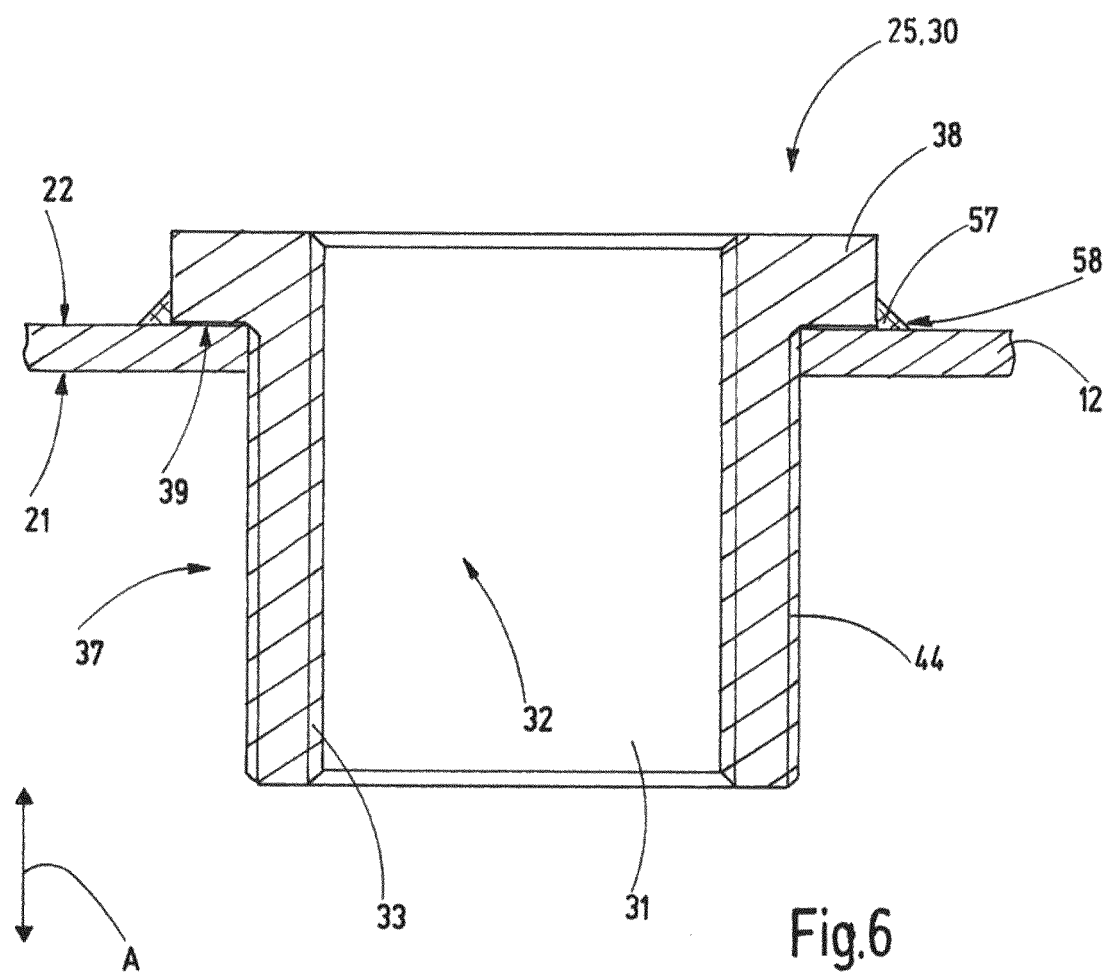

In FIG. 6 another possibility is schematically illustrated, how connection body 25 or connection sleeve 30 can be connected on housing wall 12. In this embodiment locking device 40 can be omitted such that external thread 44 can be omitted. For connection of connection body 25 on housing wall 12 a substance bond connection by means of a weld seam 57 is realized. Weld seam 57 connects flange 38 with housing outer surface 22. Weld seam 57 can, as an option, extend partly between flange surface 39 and wall outer surface 22. In the embodiment flange surface 39 directly abuts against wall outer surface 22 and the weld seam is applied around the circumference of flange 38 in the corner region between flange 38 and wall outer surface 22. Instead of a weld seam, also a braze connection can be established.

It applies in connection with all embodiments that connection sleeve 30 can be connected on wall inner surface 21 and/or wall outer surface 22 of housing 10. For example, a substance bond connection (e.g. connection by means of a weld seam) and/or an adhesive connection can be provided between connection sleeve 30 and wall inner surface 21, also if flange 38 of connection sleeve 30 is arranged on wall outer surface 22.

In all embodiments the edge surface 24 is configured in a threadless manner and preferably in a stepless manner. The wall thickness d between wall inner surface 21 and wall outer surface 22 is so small that a mechanically stable screw connection or a flame-proof threaded gap cannot be created between connection body 25 and housing wall 12. Wall thickness d is, for example, smaller than 10 mm or smaller than 8 mm or smaller than 6 mm. It can particularly be in a range of 0.8 mm to 1.2 mm.

For this reason a flame-proof gap 58 is delimited between flange surface 39 and wall outer surface 22 of housing wall 12 in the embodiments described here. The flame-proof gap 58 can be partly filled with intermediate layer 50. The flame-proof gap 58 is in terms of its dimension orthogonal to the axial direction and its dimension in axial direction configured such that also in case of an explosion, spark creation, flame creation, light arc creation or the like in the interior 13 of explosion-proof housing 11 no ignition of explosive atmosphere in the environment 17 can occur. By means of the additional locking device 40, connection body 25 can be secured against a relative movement relative to housing wall 12 as an option—if required—such that flame-proof gap 58 is also maintained against an explosion pressure in the interior 13 of the housing.

The invention refers to an explosion-proof arrangement 10 having an explosion-proof housing 11 that comprises a wall opening 23 in a housing wall 12. The wall thickness d of housing wall 12 is so small that no thread can be provided there for screwing a connection body 25 for a line feed-through or for location of a unit that would guarantee a flame-proof condition. According to the invention, a connection body 25 is inserted into wall opening 23 comprising a flange 38 with a flange surface 39. The flange surface 39 together with housing wall 12 delimits a flame-proof gap 58. The dimensions of a gap or interstice between connection body 25 and an edge surface 24 delimiting wall opening 23 of housing wall 12 are not decisive. The flame-proof condition can be solely established by flame-proof gap 58 between flange surface 39 and housing wall 12.

LIST OF REFERENCE SIGNS 10 explosion-proof arrangement
11 explosion-proof housing
12 housing wall
13 interior
14 housing body
15 housing opening
16 cover
17 environment
21 wall inner surface
22 wall outer surface
23 wall opening
24 edge surface
25 connection body
26 insert
27 line
28 unit
29 switch
30 connection sleeve
31 through-hole
32 inner wall of connection sleeve
33 thread
37 insert section
38 flange
39 flange surface
39a first section of flange surface
39b second section of flange surface
40 locking device
41 locking part
42 locking ring
43 internal thread
44 external thread
45 locking ring
46 flame-proof flat gap
47 flame-proof threaded gap
50 intermediate layer
51 adhesive layer
52 sealing body
55 ring-shaped cavity 56 axial projection
57 weld seam
58 flame-proof gap
A axial direction
b width
d wall thickness
h height

The invention claimed is:

1. An explosion-proof arrangement, comprising:
    an explosion-proof housing that comprises a housing wall having a wall inner surface and a wall outer surface opposite the wall inner surface, wherein a wall opening extends through the housing wall that is delimited by a threadless edge surface of the housing wall connecting the wall inner surface with the wall outer surface;
    a connection body comprising an insert section and a flange adjoining the insert section in an axial direction having a flange surface; and
    wherein the insert section of the connection body extends through the wall opening and wherein the flange surface is opposed to the wall inner surface or the wall outer surface and forms a flame-proof gap, wherein the explosion-proof housing is a "flame-proof enclosure" (Ex-d) according to one of the standards EN 60079-1 or IIC 60079-1-1.

2. The explosion-proof arrangement according to claim 1, wherein the flange surface abuts completely or in part against the wall inner surface or the wall outer surface via an intermediate layer.

3. The explosion-proof arrangement according to claim 2, wherein the intermediate layer is formed by a sealing body or comprises a sealing body.

4. The explosion-proof arrangement according to claim 3, wherein the flange surface is connected with the wall inner surface or the wall outer surface by an adhesive bond or substance bond.

5. The explosion-proof arrangement according to claim 4, wherein the flange surface extends at least partly in a radial plane orientated radial to the axial direction.

6. The explosion-proof arrangement according to claim 5, wherein the flange surface extends completely in the radial plane.

7. The explosion-proof arrangement according to claim 6, wherein the flange comprises a ring-shaped cavity facing the wall inner surface or the wall outer surface.

8. The explosion-proof arrangement according to claim 1, wherein the flange surface is connected with the wall inner surface or the wall outer surface by an adhesive bond or substance bond.

9. The explosion-proof arrangement according to claim 1, wherein the flange surface extends at least partly in a radial plane orientated radial to the axial direction.

10. The explosion-proof arrangement according to claim 9, wherein the flange surface extends completely in the radial plane.

11. The explosion-proof arrangement according to claim 1, wherein the flange comprises a ring-shaped cavity facing the wall inner surface or the wall outer surface.

12. The explosion-proof arrangement according to claim 11, wherein the flange surface abuts completely or in part against the wall inner surface or the wall outer surface via an intermediate layer and the intermediate layer is partly or completely arranged in the ring-shaped cavity.

13. The explosion-proof arrangement according to claim 12, wherein the intermediate layer only abuts against the flange surface inside the ring-shaped cavity.

14. The explosion-proof arrangement according to claim 1, wherein the connection body is attached to the housing wall in a force-fit and/or form-fit manner by means of a locking device.

15. The explosion-proof arrangement according to claim 1, wherein the connection body comprises an external thread.

16. The explosion-proof arrangement according to claim 15, wherein a locking ring is screwed on the connection body by means of an internal thread and the external thread of the connection body and the housing wall is clamped between the locking ring and the flange.

17. The explosion-proof arrangement according to claim 1, wherein the connection body is configured as a connection sleeve.

18. The explosion-proof arrangement according to claim 17, wherein the connection sleeve comprises a through-hole that is cylindrical.

19. The explosion-proof arrangement according to claim 18, wherein the through-hole is cylindrical in sections.

20. The explosion-proof arrangement according to claim 1, wherein a wall thickness of the housing wall is smaller than a minimum wall thickness that is required to form a flame-proof thread on the edge surface.

* * * * *